(12) United States Patent
Fu et al.

(10) Patent No.: US 9,685,071 B1
(45) Date of Patent: *Jun. 20, 2017

(54) ERECEPTIONIST AND ENEIGHBORHOOD WATCH SYSTEM FOR CRIME PREVENTION AND/OR VERIFICATION

(71) Applicant: Kuna Systems Corporation, Burlingame, CA (US)

(72) Inventors: Sai-Wai Fu, Los Altos, CA (US); Haomiao Huang, Redwood City, CA (US)

(73) Assignee: Kuna Systems Corporation, Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,196

(22) Filed: Dec. 1, 2016

Related U.S. Application Data

(63) Continuation of application No. 14/205,946, filed on Mar. 12, 2014, now Pat. No. 9,542,832.

(60) Provisional application No. 61/783,565, filed on Mar. 14, 2013.

(51) Int. Cl.
*G08B 1/08* (2006.01)
*G08B 29/18* (2006.01)
*G08B 25/10* (2006.01)
*G08B 25/00* (2006.01)
*G08B 27/00* (2006.01)

(52) U.S. Cl.
CPC ......... *G08B 29/185* (2013.01); *G08B 25/008* (2013.01); *G08B 25/10* (2013.01); *G08B 27/003* (2013.01); *G08B 27/005* (2013.01)

(58) Field of Classification Search
CPC .............................. G08B 29/18; G08B 27/008
USPC ... 340/539.17, 539.11, 539.13, 426.1, 426.2, 340/506
See application file for complete search history.

(56) References Cited

U.S. PATENT DOCUMENTS

| 5,400,246 | A | * | 3/1995 | Wilson | G08B 25/14 340/12.53 |
|---|---|---|---|---|---|
| 5,959,529 | A | * | 9/1999 | Kail, IV | G01S 19/17 128/903 |
| 7,952,476 | B1 | | 5/2011 | Causey | 340/506 |
| 2006/0154642 | A1 | | 7/2006 | Scannell | 455/404.1 |
| 2008/0249969 | A1 | | 10/2008 | Tsui | 706/46 |
| 2012/0239808 | A1 | | 9/2012 | Davis | 709/224 |
| 2012/0286949 | A1 | | 11/2012 | Worthington | 340/539.1 |

* cited by examiner

*Primary Examiner* — Daryl Pope
(74) *Attorney, Agent, or Firm* — Christopher P. Maiorana, PC

(57) ABSTRACT

A system comprising an antenna module and a processor sub-module. The antenna module is configured to connect and send data to a network through a wireless connection. The network is configured to (A) connect to web services in a first mode and (B) integrate with user devices in a second mode. The processor sub-module is configured to provide a physical connection to (i) the antenna module, (ii) a plurality of output devices, and (iii) a plurality of sensors. The plurality of output devices are configured to implement a virtual receptionist. The plurality of sensors send data to the network.

20 Claims, 9 Drawing Sheets

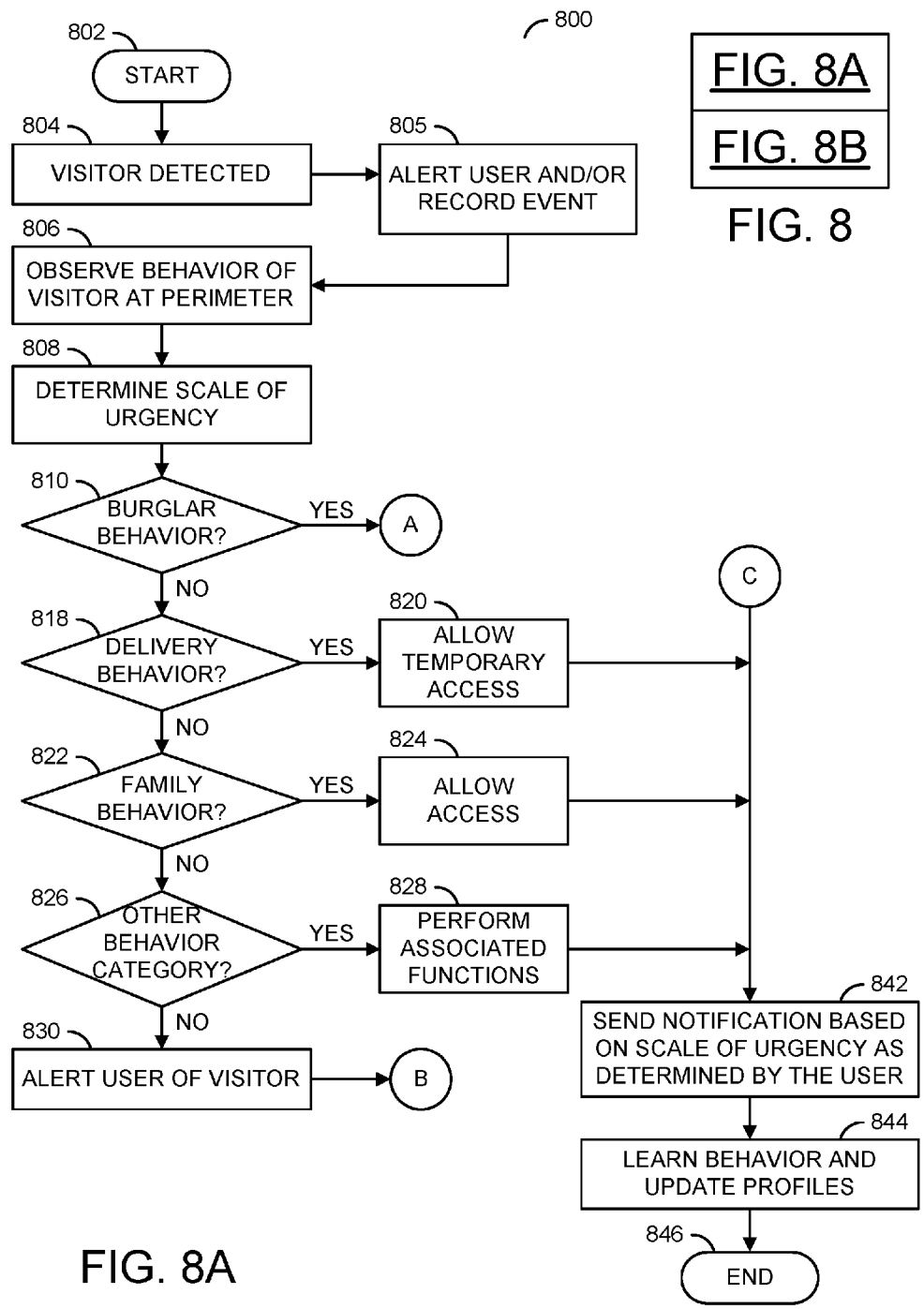

ERECEPTIONIST AND ENEIGHBORHOOD WATCH SYSTEM FOR CRIME PREVENTION AND/OR VERIFICATION

This application relates to U.S. Ser. No. 14/205,946, filed Mar. 12, 2014, which relates to U.S. Provisional Application No. 61/783,565, filed Mar. 14, 2013, each of which are hereby incorporated by reference in their entirety.

FIELD OF THE INVENTION

The present invention relates to visitor verification generally and, more particularly, to an eReceptionist and eNeighborhood watch system for crime prevention and/or verification.

BACKGROUND OF THE INVENTION

Crime statistics show most burglars visit the front door first before attempting to enter a premise. Statistics show 72.4% of burglaries occur when the premise is unoccupied (National Crime Survey, 2003-2007). Most burglars scout for easy targets. When victimized homes are occupied, many more homes are targeted when women were home alone than men.

Conventional crime prevention solutions are passive and offer little crime prevention value. Conventional solutions include outdoor security cameras, signs, and decals from traditional alarm companies. The effectiveness of conventional crime prevention solutions is limited because criminals know they have time to take some valuables and leave before police arrive, even if the alarm is triggered. Many burglaries are not considered high priorities for the police and they will not pursue investigation even if video images of the criminals are available.

One alternative is for a homeowner to construct his own system with similar functionality. There are security video cameras that can detect motion and send alerts to homeowners and let them view live video. However, such cameras are designed for monitoring, and not designed to deter and prevent criminals. They are missing critical features that make prevention effective.

The disadvantages of current crime prevention solutions are significant. An alarm system only tells the criminals that the police may come in approximately 8 minutes if the alarm is triggered. An alarm system is inconvenient to arm and generates many false alarms. Criminals know that alarm systems are often not armed. Alarm systems also indicate to criminals that often no one is at home and there are valuables to protect.

Conventional crime prevention solutions also do not enable easy sharing of collected images, video, and other information among neighbors or other people.

It would be desirable to implement an eReceptionist and eNeighborhood watch system for crime prevention and/or verification.

SUMMARY OF THE INVENTION

The present invention concerns a system comprising an antenna module and a processor sub-module. The antenna module is configured to connect and send data to a network through a wireless connection. The network is configured to (A) connect to web services in a first mode and (B) integrate with user devices in a second mode. The processor sub-module is configured to provide a physical connection to (i) the antenna module, (ii) a plurality of output devices, and (iii) a plurality of sensors. The plurality of output devices are configured to implement a virtual receptionist. The plurality of sensors send data to the network.

The objects, features and advantages of the present invention include providing an eReceptionist and eNeighborhood watch system that may (i) deter scouting criminals, (ii) link multiple such services in a neighborhood for an effective virtual neighborhood watch program in a residential and/or business environment, (iii) prevent false alarms by verifying security alarms, (iv) automatically detect visitors, (v) connect with central security monitoring services, (vi) store and update visitor profiles, (vii) learn the behavior of residents, (viii) perform functions based on a scale of urgency, and/or (ix) be cost effective to implement.

BRIEF DESCRIPTION OF THE DRAWINGS

These and other objects, features and advantages of the present invention will be apparent from the following detailed description and the appended claims and drawings in which:

FIGS. 8A and 8B are flow diagrams illustrating visitor categorization and/or scale of urgency responses.

DETAILED DESCRIPTION OF THE PREFERRED EMBODIMENTS

Figure 1:
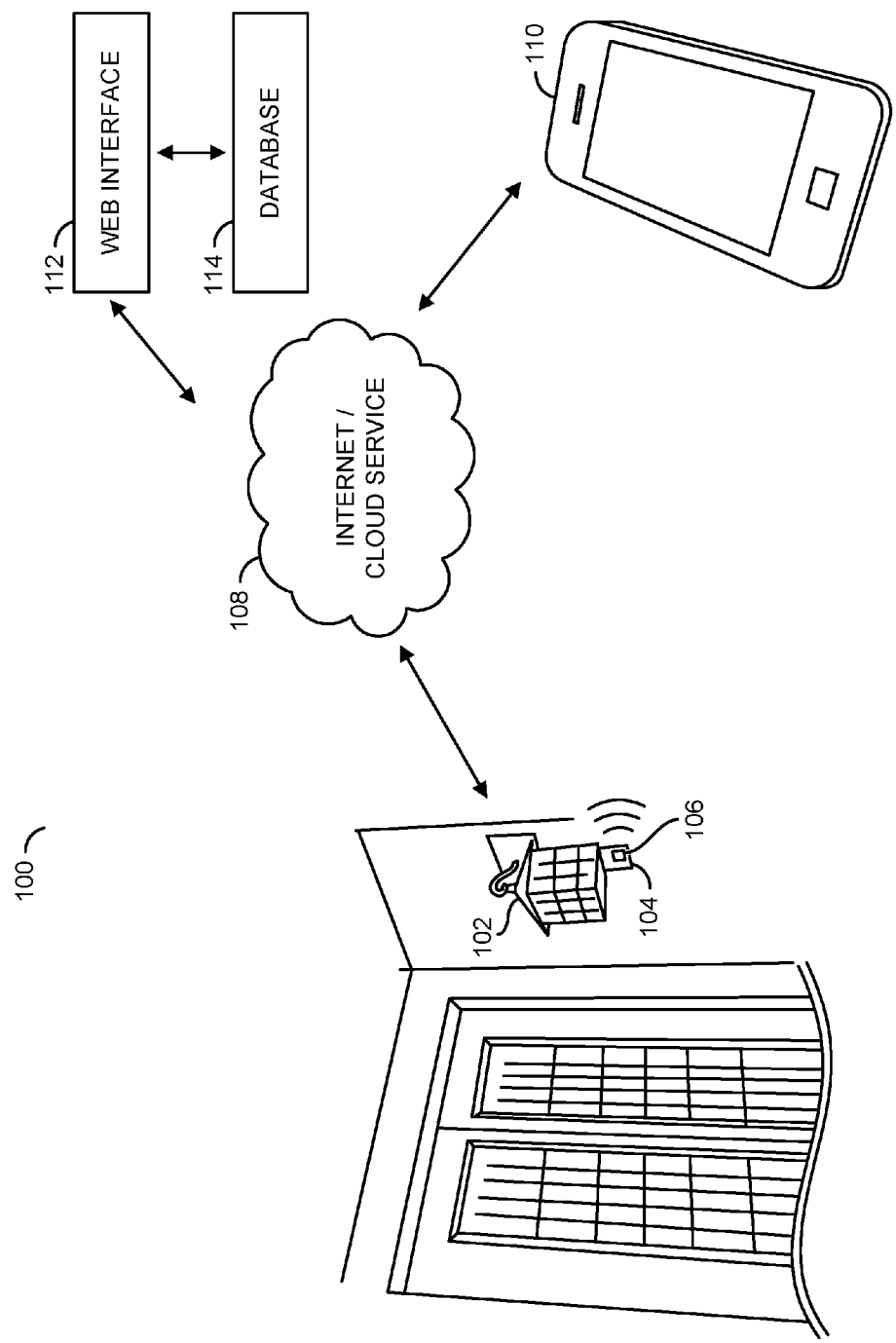
FIG. 1 is a diagram illustrating an example embodiment.

Referring to FIG. 1, a diagram of a system 100 is shown in accordance with a preferred embodiment of the present invention. The system 100 generally comprises a block (or circuit) 102, a block (or circuit) 104, a block (or circuit) 106, and block (or circuit) 108, a block (or circuit) 110, a block (or circuit) 112, and a block (or circuit) 114. The circuit 102 may be a smart camera system. The circuit 104 may be a processor sub-module for the smart camera system 102. The circuit 106 may be a Wi-Fi antenna. The circuit 108 may be an internet and/or cloud service. The circuit 110 may be a user device. The user device 110 may be a smartphone and/or other personal computing device. The block 112 may be a web interface. The block 114 may be a database. The smart camera system 102 generally comprises the processor sub-module 104. The processor sub-module 104 generally comprises the Wi-Fi antenna 106. The Wi-Fi antenna 106 may send data to the internet and/or cloud service 108. In one example, data sent by the Wi-Fi antenna 106 to the internet and/or cloud service 108 may then be sent to the user device 110. The user device 110 may be a smartphone. In another example, data sent by the Wi-Fi antenna 106 to the internet and/or cloud service 108 may then be sent to the web interface 112. The web interface 112 may be configured to allow a user to access the database 114. The database 114 may store images, video, audio, visitor IDs, and/or visitor profiles.

A user may use the smartphone 110 and/or the web interface 112 to send data back to the smart camera 102 through the internet and/or cloud service 108. Data sent by the user to the internet and/or cloud service 108 may be presented to the Wi-Fi antenna 106. The Wi-Fi antenna 106 may receive data. The sub-processor module 104 of the smart camera 102 may process data received by the Wi-Fi antenna 106. In one example, the homeowner may have an option on the smartphone 110 for quick (e.g., one button) recording and/or sharing of images of unwelcomed visitors to trusted neighbors. The web interface 112 may collect all the shared images and/or manage the database 114 of such images for prevention in the future.

The system 100 may have two major components, an eReceptionist and an eNeighborhood Watch. The eReceptionist system automatically alerts homeowners when there is a visitor at their front door. For example, the smart camera 102 may detect a visitor and send a notification to the homeowner on the smartphone 110 of the homeowner. The eReceptionist enables homeowners to use the smartphone 110, or other devices, to see the visitor at their front doors through a video camera and converse with the visitor through an intercom. The web interface 112 and/or the smartphone 110 may allow the homeowner to use the eReceptionist system from any location. If the visitor is unwelcome, the homeowner may proactively deter the unwelcomed visitor. For example, the homeowner may pretend to be at home. If the homeowner does not want to speak with the unwelcomed visitor, the homeowner may forward the video call to "trusted neighbors" to scare off the unwelcomed visitor. If the unwelcomed visitor continues to scout the home and is seen by the homeowner or trusted neighbor through another smart camera 102, the homeowner may announce through the intercom to forcefully ask the intruder to leave. For example, the eReceptionist system 100 may be implemented in an apartment building. Conventional security systems in an apartment building allow a visitor to buzz a resident from outside to be let in and/or speak over an intercom. Conventional security systems in an apartment building may make it difficult and/or unsafe for a resident to verify the visitor. The eReceptionist system 100 may allow automatic verification of visitors.

The eNeighborhood Watch system may enable homeowners to quickly take images, video, and/or audio of an unwelcomed visitor at their front door. The images, video, and/or audio may be shared the with a network of trusted neighbors. For example, if a neighbor sees the same unwelcomed visitor at their front door, the neighbor may be in a state of high alert and find ways to prevent a potential burglary.

Figure 2:
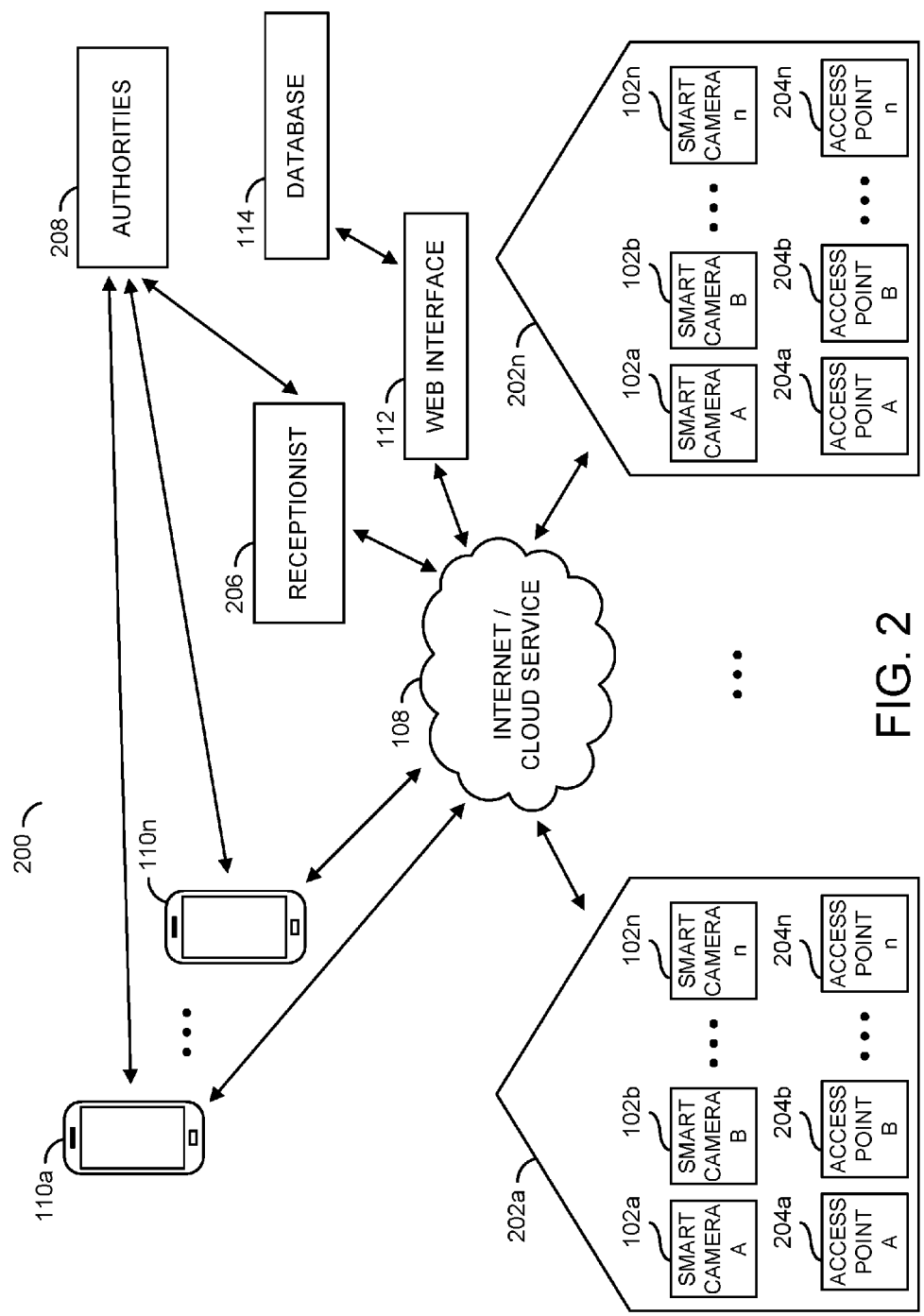
FIG. 2 is a diagram illustrating an example embodiment of an eNeighborhood Watch system.

Referring to FIG. 2, a diagram of a system 200 is shown. The system 200 may be an example embodiment of an eNeighborhood Watch system. The eNeighborhood Watch system 200 generally comprises blocks (or circuits) 102a-102n, the internet and/or cloud service 108, blocks (or circuits) 110a-110n, the web interface 112, the database 114, blocks 202a-202n, blocks 204a-204n, a block (or circuit) 206, and a block (or circuit) 208. The circuits 102a-102n may be smart cameras. The circuits 110a-110n may be smartphones and/or other personal computing devices. The blocks 202a-202n may be homes and/or business premises in a neighborhood. The blocks 204a-204n may be access points to the homes and/or business premises 202a-202n. The smart cameras 102a-102n may be set up at each of the access points 204a-204n of the homes and/or business premises 202a-202n. The block 206 may be a receptionist. In one example, the receptionist 206 may be a virtual receptionist. In another example, the receptionist 206 may be a person from a central monitoring service. The block 208 may represent authorities. The authorities 208 may be the police department, the fire department, an ambulance, and/or other emergency services.

The homes and/or business premises 202a-202n in the eNeighborhood Watch system 200 may have access points 204a-204n. For example, the access points 204a-204n may be doors, windows, garages, other entrances, and/or vantage points. Generally, the smart cameras 102a-102n may be mounted at the access points 204a-204n. Data from the smart cameras 102a-102n at the homes and/or business premises 202a-202n may be sent to the internet and/or cloud service 108.

Data sent to the internet and/or cloud service 108 may be sent to the user devices 110a-110n. For example, an alert from one of the smart cameras 102a-102n from the home 202a may be sent to the device 110a of the homeowner indicating that another family member has arrived home. In another example, an alert from one of the smart cameras 102a-102n from the home 202n may be sent to the smartphone 102c of an owner of another home (e.g., the owner of the home 202b) that a suspicious person has been identified in the neighborhood. A user may then send a notification to the authorities 208. A user of the user devices 110a-110n may send data back to the smart cameras 102a-102n of the homes and/or business premises 202a-202n through the internet and/or cloud service 108. In one example, a homeowner may send a command to arm an alarm at their home. In one example, the user devices 110a-110n may be in the possession of trusted volunteers. The trusted volunteers may be other home owners in the eNeighborhood Watch system 200. The trusted volunteers may be the first line of response to a security issue detected by the system 100. Alerts by the system 100 may be sent in parallel to all the trusted volunteers. The trusted volunteers may use available communication channels provided such as cell phones, telephone and/or emails. The homeowner may advise particular pre-defined responses to particular alerts such as calling the authorities 208 (e.g., the police and/or the fire department). The trusted volunteers may be able to activate a set of pre-defined actions using the user devices 110a-110n. The trusted volunteers may take training sessions to learn how to properly respond to various alerts. The training sessions may be taken on-line. The on-line training sessions may be available on the web interface 112.

Data sent to the internet and/or cloud service 108 may be sent to the receptionist 206. For example, if a visitor arrives at one of the homes 202a-202n and nobody is home, the receptionist 206 may be able to communicate with the visitor through one of the smart cameras 102a-102n. In one example, the receptionist 206 may be able to make the visitor believe that a family is home when the family is on vacation. The receptionist 206 may be able to alert the authorities 208. For example, if an alert is sent to the receptionist 206 that a suspicious visitor is near one of the homes 202a-202n the receptionist may be able to verify that the visitor is a burglar and notify the authorities 208. For example, there is a growing trend of police forces not responding to unverified alarms. Verification of burglars by the receptionist 206 may prevent false alarms being sent to the authorities 208.

In one example, the receptionist 206 may not be the first line of response. For example, the trusted volunteers may be the first line of response. The receptionist 206 may be a back up service to other security services. The receptionist 206 may respond to alerts from the system 100 if none of the trusted volunteers are available after a preset amount of time. The receptionist 206 may invoice the homeowner for any services rendered. The receptionist 206 may be personnel for the central monitoring service. The central monitoring service may offer a range of services. For example, the range of services offered by the central monitoring service may include a virtually free service, and/or a state-of-the-art monitoring service. The central monitoring service may supplement free and/or virtually free alert services implemented by the system 100.

Data sent to the internet and/or cloud service 108 may sent to the database 114. The web interface 112 may allow a user to access the database 114. The web interface 112 may be accessed using the smartphones 110a-110n and/or other user devices. The database 114 may store images, videos, audio, visitor IDs, and/or visitor profiles sent from the smart cameras 102a-102n on the premises 202a-202n. For example, the database 114 may be accessible by all users in the eNeighborhood Watch system 200. In another example, the database 114 may provide different levels of access for different members of the eNeighborhood Watch system 200. For example, all members of the eNeighborhood Watch system 200 may have access to videos, images, and/or visitor profiles of a potential burglar. However, a member of one home may not want another member of the eNeighborhood Watch system 200 to view the profile of a family member and/or friend.

If the network of trusted neighbors 202a-202n has the same system, they may exchange images, video, and/or other information of unwelcomed visitors. The website and/or web interface 112 may have the database 114 to manage the images, video, and/or other information. Unwelcome visitors stored in the database 114 may be shared with other neighbors and/or the authorities 208 using the web interface 112. For example, when the unwelcomed visitors learn about the database 114 they may not target the neighborhood 202a-202n.

The database 114 may contain a "whitelist" of known and trusted individuals circulating through the neighborhood 202a-202n. For example, children going door to door for a school activity may be on the whitelist. The whitelist may allow neighbors, the authorities 208, and/or other relevant parties know that visitors on the whitelist may be in the neighborhood 202a-202n. For example, the visitors from the whitelist may be trusted and/or watched for to increase their safety. The whitelist may include residents and/or approved friends. The database 114 may collect images and/or IDs of visitors from the whitelist. Information from the database 114 and new information from the smart cameras 102a-102n may improve categorization of visitors. Various responses may be programmed into the smart cameras 102a-102n. The responses to visitors on the whitelist may be based on a scale of urgency. For example, a visitor on the whitelist may get a response of a personal greeting. The database 114 may also contain a "blacklist" of known untrusted visitors. The blacklist may include suspicious visitors from prior visits, visitors that appear on a wanted list from the authorities 208, etc. The smart cameras 102a-102n may collect images, videos, and/or IDs from visitors that appear on the blacklist. The smart cameras 102a-102n may send updated images, videos, and/or IDs to the database 114 for improved categorization and/or profile updating. The blacklist may be used to determine a response to a visitor. The response to a visitor on the blacklist may be based on the scale of urgency. For example, a visitor on the blacklist may receive warnings and/or deterrents. Deterrents may include pre-recorded messages, disguising the voice of a person, sirens, flashing lights, smoke, and/or tear gas.

Multiple levels of alerts may be implemented to distinguish unwelcomed visitors from welcomed visitors (e.g., household members). Since most visitors may be welcomed, it is important to identify strangers and raise the level of alert for immediate attention. The technology to identify welcomed visitors may include facial recognition, voice recognition, machine learning of habits and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 100 may determine that exterior lighting is needed and/or interior lighting is not needed. In another example, if a family is on vacation the system may turn on interior lighting to make it appear to a potential burglar that the home is occupied. The learned behavior may develop a unified status of the home (e.g., based on occupancy, time of day, weather, security status, etc.). Pre-defined functions may be performed based on the unified status of the home.

Multiple camera detection technology in combination with the smart cameras 102a-102n may be implemented to identify un-authorized trespassers. For example, if a visitor stops by multiple doors of the same house the visitor is likely an unwelcomed trespasser. Using separate smart cameras 102a-102n at the access points 204a-204n, computer vision technology, and/or machine learning technology, the system 200 may accurately identify unwelcomed trespassers, alert the authorities 208, and/or alert the homeowners.

Figure 3:
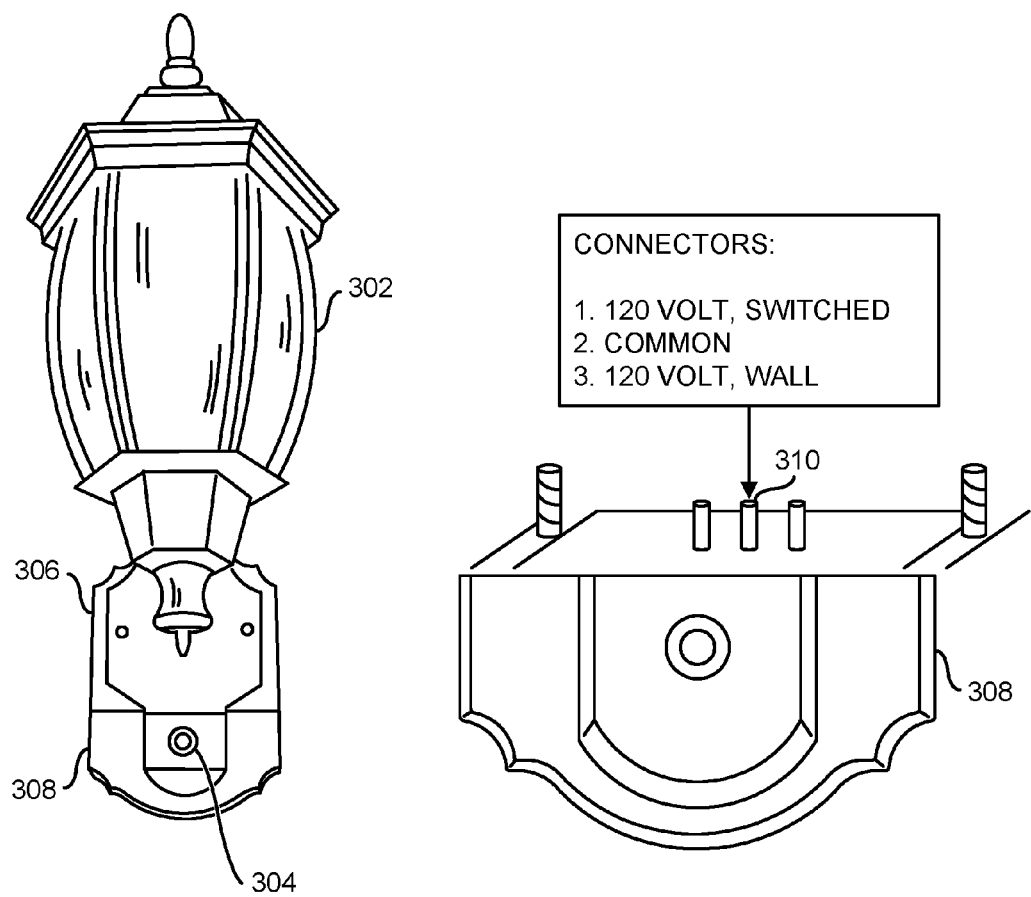
FIG. 3 is a diagram illustrating a modular design of a universal fixture base configuration for a light.

Referring to FIG. 3, a modular design of a universal fixture base configuration is shown. The modular design generally comprises a light fixture 302, a lens module 304, a housing 306, a modular universal base 308, and a plug 310. The modular universal base 308 may be connected to the housing 306. The modular universal base 308 may be connected or disconnected without removing the light fixture 302 and/or the housing 306 from a wall. The modular universal base 308 may contain the lens module 304 and the processor sub-module 104 (as described in connection with FIG. 1). The lens module 304 is shown attached to the modular universal base 308. However, the lens module 308 may be implemented as a sub-module and may be separately mounted to allow different viewing angles as desired by the user. The processor sub-module 104 may provide the plug 310 to enable the processor sub-module 104 to control a light bulb and/or power the smart camera system 102. The plug 310 is shown as a 3-pronged plug that may provide a switched 120V power source to the light fixture 302. Other plug variations may be implemented to meet the design criteria of a particular implementation. The plug 310 may allow the smart camera system 102 to operate without batteries.

Figure 4:
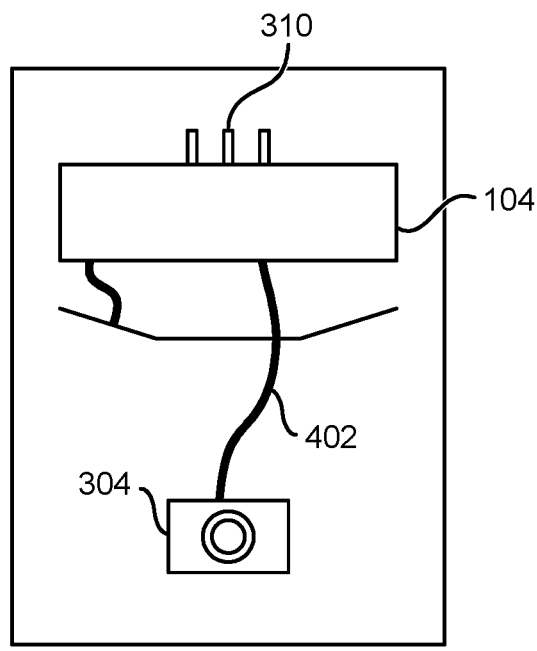
FIG. 4 is a diagram illustrating a processor sub-module connected to a lens sub-module.

Referring to FIG. 4, the processor sub-module 104 connected to the lens sub-module 304 is shown. The processor sub-module 104 and the lens sub-module 304 may be connected with a cable 402. Separating the processor sub-module 104 and the lens sub-module 304 may allow the modules to easily attach to various light fixture styles. The processor sub-module 104 may fit inside the housing 306, and/or the modular universal base 308 and connect to the light fixture 302 and/or housing 306 with the plug 310. The processor sub-module 104 may be implemented as a flexible plate and/or may have speakers, a microphone, an antenna, and/or a USB and/or other connector for a PC connection and/or Wi-Fi setup. The processor sub-module 104 may provide a connection for control signals. The lens sub-module 304 may be smaller than a common Heath-Zenith PIR sub-modules used in many light fixtures. However, the particular size of the lens sub-module 304 may be varied to meet the design criteria of a particular implementation. The lens sub-module 304 may be pivotable to provide a desired viewing angle.

Figure 5:
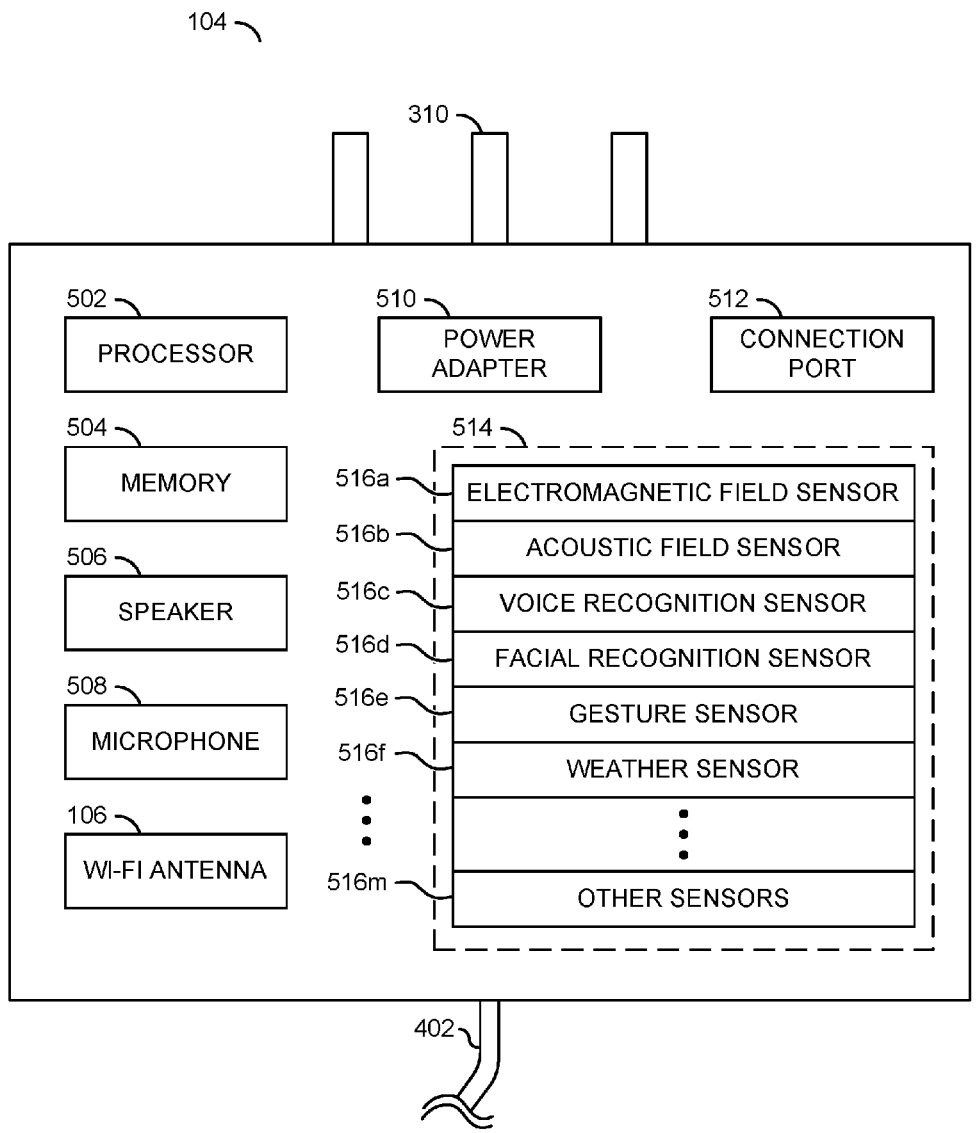
FIG. 5 is a diagram illustrating a processor sub-module.

Referring to FIG. 5, a detailed illustration of the processor sub-module 104 is shown. The processor sub-module 104 generally comprises the Wi-Fi antenna 106, the plug 310, a block (or circuit) 502, a block (or circuit) 504, a block (or circuit) 506, a block (or circuit) 508, a block (or circuit) 510, a block (or circuit) 512, a block (or circuit) 514, and blocks (or circuits) 516a-516m. The circuit 502 may be implemented as a processor. The processor 502 may process input signals and/or generate various control signals. The circuit 504 may be implemented as a memory. The circuit 506 may be implemented as a speaker. The circuit 508 may be implemented as a microphone. The circuit 510 may be implemented as a power adapter. The circuit 512 may be implemented as a connection port. The circuit 514 may be implemented as a sensor I/O block. The sensor I/O block 514 may include a number of sensor modules 516a-516m. The sensor modules 516a-516m may include an electromagentic field sensor, an acoustic field sensor, a voice recognition sensor, a facial recognition sensor, a gesture sensor, a weather sensor, a passive infrared sensor, an active infrared sensor, a sonar sensor, a contact sensor, a smoke sensor, a radio-frequency identification (RFID) sensor, and/or other security system sensors. The processor sub-module 104 is shown with a cable 402 to connect to the lens sub-module 304. However, the lens sub-module 304 may be implemented as a lens module on the processor sub-module 104.

The processor sub-module 104 may be configured to perform voice impersonation technology during real time two-way intercom communication. For example, to deter a potential burglar it is important to make the potential burglar believe there is a physically strong person at the house. Burglary statistics show that females at home are much more likely to be burglarized than males at home. The voice impersonation technology may be implemented with the smartphone 110 and/or a 2-way intercom system inside the home for the purpose of deterring potential burglar. The memory 504 may store voice data for a preferred voice type. The impersonated voice may be transmitted using the speaker 506. In another example, pre-recorded background voices and/or sound may be added to the voice of the homeowner and/or trusted neighbors during an intercom session with the visitor. Adding additional voices and/or sound may be used to make a potential burglar believe there are multiple people in the house. The activation of voice impersonation, adding additional voices, and/or adding additional sounds may be selected quickly and/or be a preset option.

Pre-recorded voice messages in the smart camera 102 may deter an unwelcomed visitor. The message may be activated upon detection of an unwelcomed visitor, based on the database 114 of welcome visitors. In one example, the message may be a custom recording by the homeowner. In another example the voice may be from the authorities 208, such as the voice of a local police sheriff. The voice recording may be recorded using the microphone 508. The voice recording may be stored in the memory 504. The voice recording may be transmitted with the speaker 506.

Figure 6:
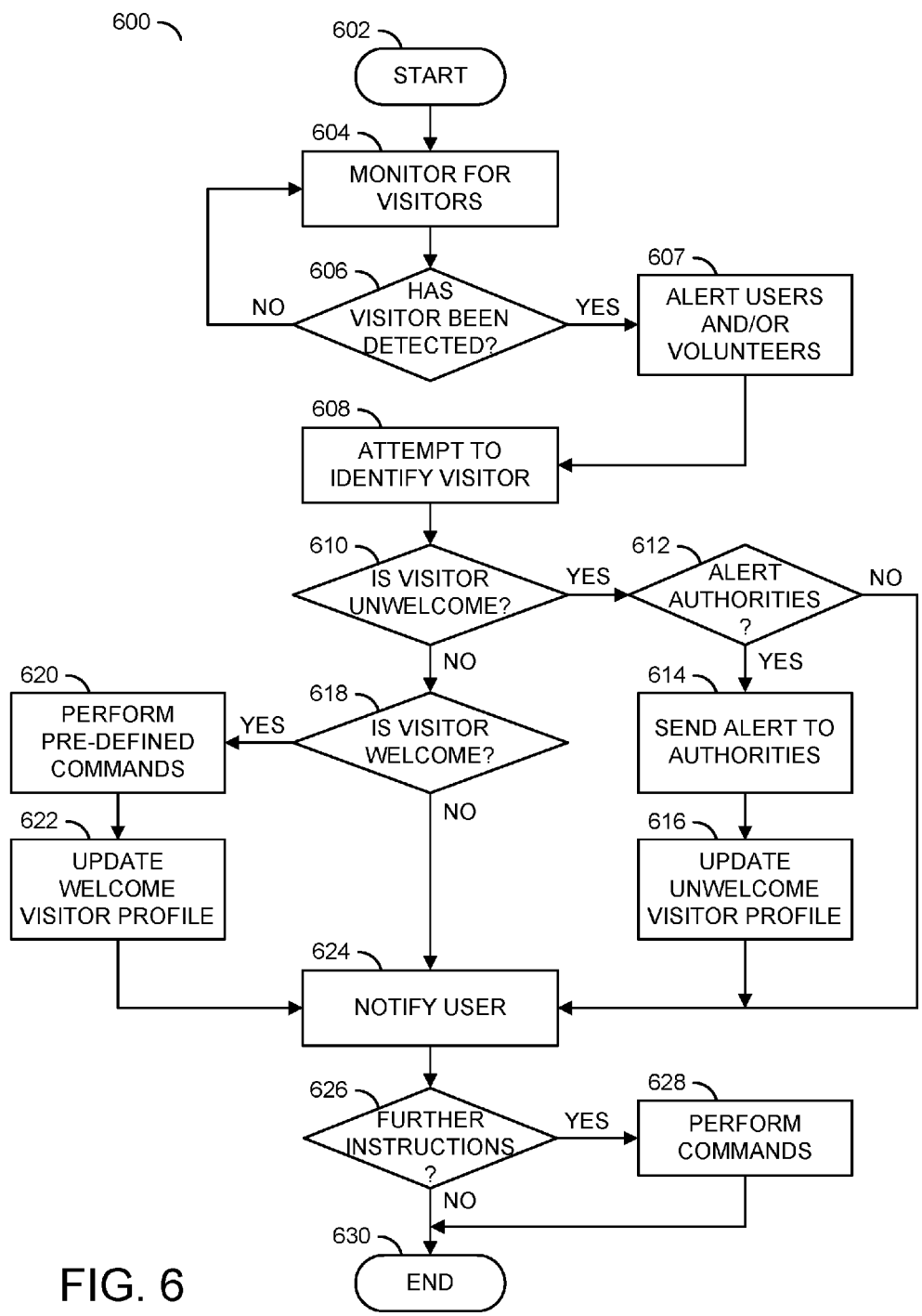
FIG. 6 is a flow diagram illustrating a smart camera eReceptionist monitoring for visitors.

Referring to FIG. 6, a flow diagram of a method (or process) 600 is shown. The method 600 may illustrate the smart camera 102 eReceptionist monitoring for visitors. The method 600 generally comprises a step (or state) 602, a step (or state) 604, a decision step (or state) 606, a step (or state) 607, a step (or state) 608, a decision step (or state) 610, a decision step (or state) 612, a step (or state) 614, a step (or state) 616, a decision step (or state) 618, a step (or state) 620, a step (or state) 622, a step (or state) 624, a decision step (or state) 626, a step (or state) 628, and a step (or state) 630. The state 602 may start the method 600. Next, in the state 604 the smart camera 102 may monitor for visitors. Next, the method 600 may move to the decision state 606. In the decision state 606, if the method 600 determines a visitor has been detected the method 600 may move to the state 607. If not, the method 600 may move to the state 604. The state 607 may alert users and/or volunteers. For example, alert may be sent to the user devices 110a-110n. The state 608 may attempt to identify the visitor. Next, method 600 may move to the decision state 610. In the decision state 610, if the method 600 determines the visitor is unwelcome the method 600 may move to the decision state 612. In the decision state 612, if the method 600 decides to alert the authorities (e.g., the authorities 208) the method 600 may move to the state 614. If not, the method 600 may move to the state 624. The state 614 may send an alert to the authorities 208. Next, the state 616 may update the profile of the unwelcome visitor and the method 600 may move to the state 624. In the decision state 610, if the method 600 determines the visitor is not unwelcome the method 600 may move to the decision state 618. In the decision state 618, if the method 600 determines the visitor is welcome the method 600 may move to the state 620. If not, the method 600 may move to the state 624. The state 620 may perform pre-defined commands for the welcome visitor. Next, the state 622 may update the profile of the welcome visitor. The method 600 may then move to the state 624. The state 624 may notify the user of the visitor and/or any commands performed. Next, the method 600 may move to the decision state 626. In the decision state 626, if the method 600 determines the user has any further instructions the method 600 may move to the state 628. If not, the method 600 may move to the state 630. The state 628 may perform commands associated with the instructions from the user. Next, the method 600 may move to the state 630. The state 630 may end the method 600.

The smart cameras 102a-102n may monitor for visitors at the access points 204a-204n. Monitoring by the smart cameras 102a-102n may be automatic. For example, a visitor may not need to press a button (e.g., a button at a door, or a doorbell) to interact with the smart cameras 102a-102n. The smart cameras 102a-102n may automatically detect a visitor and send an alert to the home owner and/or trusted neighbor.

Figure 7:
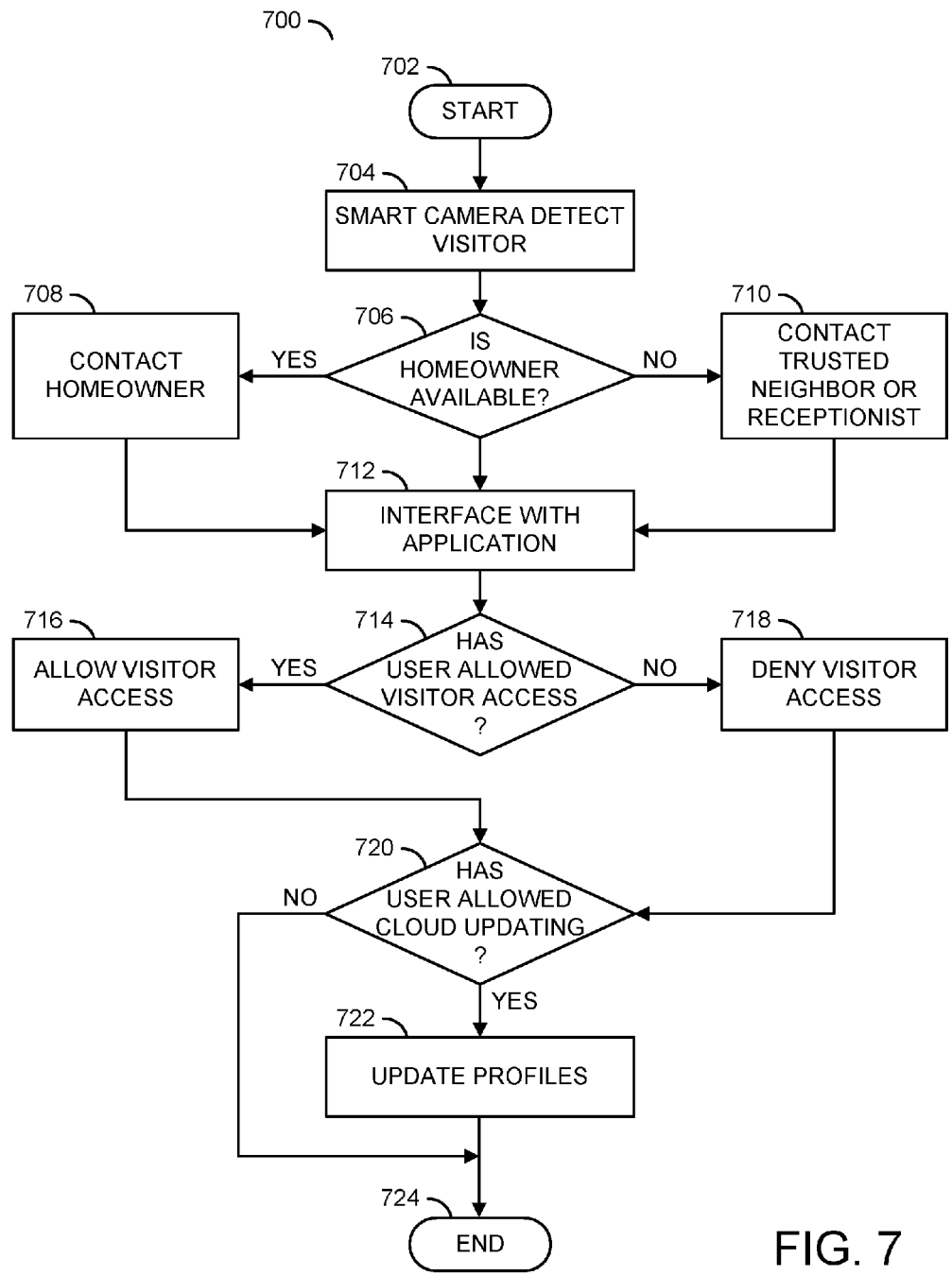
FIG. 7 is a flow diagram illustrating an application for users to allow visitors access to a home.

Referring to FIG. 7, a flow diagram of a method (or process) 700 is shown. The method 700 may describe an application for users to allow visitors access to a home. The method 700 generally comprises a step (or state) 702, a step (or state) 704, a decision step (or state) 706, a step (or state) 708, a step (or state) 710, a step (or state) 712, a decision step (or state) 714, a step (or state) 716, a step (or state) 718, a decision step (or state) 720, a step (or state) 722, and a step (or state) 724. The state 702 may start the method 700. Next, in the state 704 the smart camera 102 may detect a visitor. Next, the method 700 may move to the decision state 706. In the decision state 706, if the method 700 determines the homeowner is available the method 700 may move to the state 708. The state 708 may contact the homeowner. Next, the method 700 may move to the state 712. In the decision state 706, if the method 700 determines the homeowner is not available the method 700 may move to the state 710. The state 710 may contact a trusted neighbor (e.g., a neighbor from one of the homes 202a-202n) and/or the receptionist 206. Next, the method 700 may move to the state 712. The state 712 may allow the person contacted to interface with an application. For example, the application may be available on the user devices 110a-110n. Next, the method 700 may move to the decision state 714. In the decision state 714, if the method 700 determines the user has allowed the visitor access to the premises the method 700 may move to the state 716. The state 716 may allow the visitor access to the premises. Next, the method 700 may move to the decision state 720. In the decision state 714, if the method 700 determines the user has not allowed the visitor access to the premises the method 700 may move to the state 718. The state 718 may deny the visitor access to the premises. Next, the method 700 may move to the decision state 720. In the decision state 720, if the method 700 determines the user has allowed cloud updating the method 700 may move to the state 722. The state 722 may update visitor profiles on the cloud service 108. Next, the method 700 may move to the state 724. In the decision state 720, if the method 700 determines the user has not allowed cloud updating the method 700 may move to the state 724. The state 724 may end the method 700.

Figure 8B:
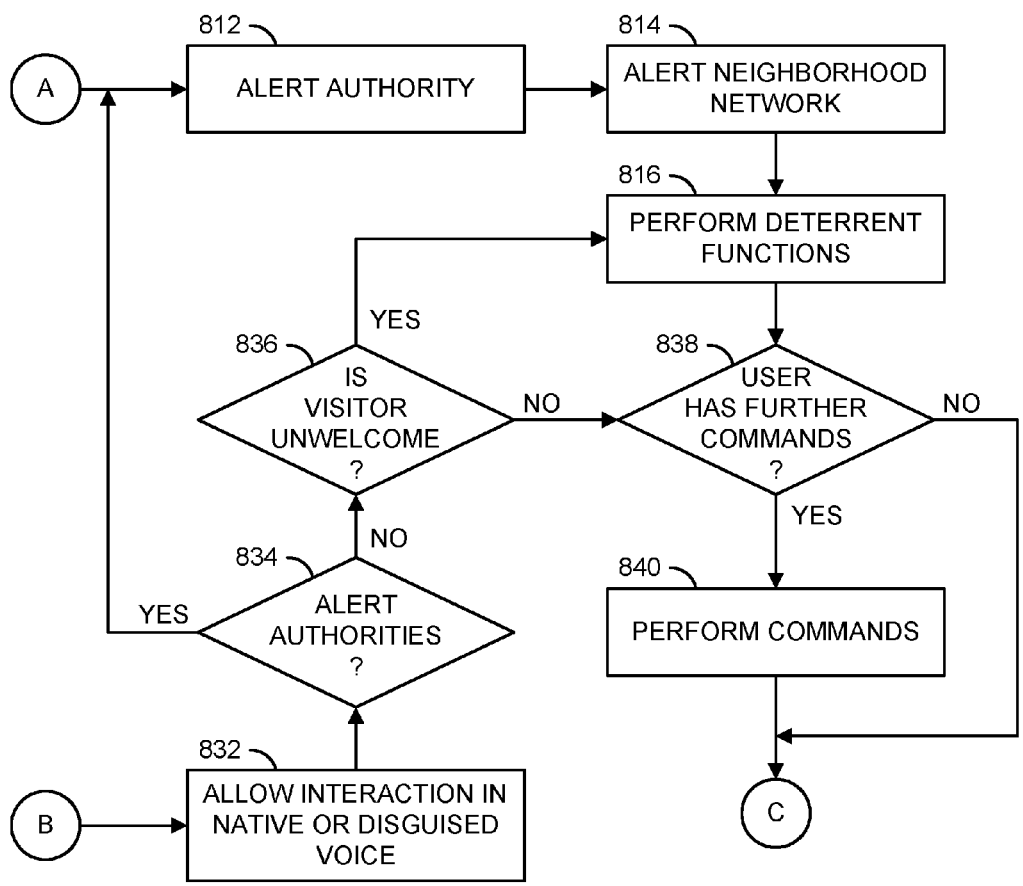

Referring to FIG. 8A and FIG. 8B, a flow diagram of a method (or process) 800 is shown. The method 800 may illustrate visitor categorization and/or scale of urgency responses. The method 800 generally comprises a step (or state) 802, a step (or state) 804, a step (or state) 805, a step (or state) 806, a step (or state) 808, a decision step (or state) 810, a step (or state) 812, a step (or state) 814, a step (or state) 816, a decision step (or state) 818, a step (or state) 820, a decision step (or state) 822, a step (or state) 824, a decision step (or state) 826, a step (or state) 828, a step (or state) 830, a step (or state) 832, a decision step (or state) 834, a decision step (or state) 836, a decision step (or state) 838, a step (or state) 840, a step (or state) 842, a step (or state) 844, and a step (or state) 846. The state 802 may start the method 800. Next, in the state 804 the smart cameras 102a-102n may detect a visitor. The state 805 may alert the user and/or record the event. For example, the lens sub-module 304 may take a picture of the event, and/or record video. The state 806 may observe the behavior of the visitor at the perimeter of the premises using the smart cameras 102a-102n. Next, the state 808 may determine the scale of urgency based on the behavior of the visitor. Next, the method 800 may move to the decision state 810. In the decision state 810, if the method 800 determines the visitor is demonstrating burglar behavior the method 800 may move to the state 812. The state 812 may alert the authorities 208.

Next, the state 814 may alert the neighborhood network (e.g., neighbors in the neighbors 202a-202n) of a burglar in the area. The state 816 may perform deterrent functions. Next, the method 800 may move to the decision state 838. In the decision state 810, if the method 800 determines the visitor is not demonstrating burglar behavior the method 800 may move to the decision state 818. In the decision state 818, if the method 800 determines the visitor is demonstrating delivery behavior the method 800 may move to the state 820. The state 820 may allow the visitor temporary and/or limited access to the premises (e.g., only enough access to allow the visitor to deliver a package). Next, the method 800 may move to the state 842. In the decision state 818, if method 800 determines the visitor is not demonstrating delivery behavior the method 800 may move to the decision state 822. In the decision state 822, if the method 800 determines the visitor is demonstrating family behavior the method 800 may move to the state 824. The state 824 may allow the family member access to the premises.

Next, the method 800 may move to the state 842. In the decision state 822, if the method 800 determines the visitor is not demonstrating family behavior the method 800 may move to the decision state 826. In the decision state 826, if the method 800 determines the visitor is demonstrating behavior of another pre-defined category the method 800 may move to the state 828. The state 828 may perform associated functions based on the pre-defined category of the visitor. Next, the method 800 may move to the state 842. In the decision state 826, if the method 800 determines the visitor is not demonstrating behavior of another pre-defined category the method 800 may move to the state 830. The state 830 may alert the user of a visitor. For example, an alert may be sent to the user device 110. Next, the method 800 may move to the state 832. The state 832 may allow the user to interact with the visitor in their native voice and/or a disguised voice. For example, the user may speak into the user device 110 and the data may be sent to the processor sub-module 104. The processor sub-module may disguise the voice of the user and playback the disguised voice through the speaker 506.

Next, the method 800 may move to the decision state 834. In the decision state 834, if the method 800 determines the user has selected to alert the authorities 208 the method 800 may move to the state 812. If not, the method 800 may move to the decision state 836. In the decision state 836, if the method 800 determines the user has selected that the visitor is unwelcome the method 800 may move to the state 816. If not, the method 800 may move to the decision state 838. In the decision state 838, if the method 800 determines the user has further commands the method 800 may move to the state 840. The state 840 may perform the commands issued by the user. Next, the method 800 may move to the state 842. In the decision state 838, if the method 800 determines the user has not issued further commands the method 800 may move to the state 842. The state 842 may send notifications based on the scale of urgency as determined by each user. For example, the notification may be sent to the user device 110. In one example, the notification may be that a family member has arrived home. In another example, the notification may be that a package has been delivered. In a further example, the notification may be that authorities have been alerted due to a burglar on the premises. The particular notification may be varied to meet the design criteria of a particular implementation. Each user may set up a particular notification type corresponding to the scale of urgency. Set up of notifications may be implemented through the web interface 112. Next, the method 800 may move to the state 844. The state 844 may learn the behavior of a visitor and update a visitor profile. Next, the state 846 may end the method 800.

The system 100 may be used to characterize the behavior of visitors. For example, the system 100 may produce a "scale of urgency" (e.g., a scale from 1 to 100). The system 100 may send alert signals to a user based on the scale of urgency. The system 100 may send meta-data and/or a description of a recording from the smart camera 102 along with the alert. For example, the alert signal may be sent to the smart phone 110. The scale of urgency may be determined by the behavior of the visitors (e.g., the time of the visit, how long the visitor remains on the premises, interactions with other premises in the neighborhood, number of doors the visitor attempts to enter, whether the visitor is on a whitelist or a blacklist, based on information from the database 114, etc.) For example, residents of the home arriving during an expected time frame may have a low scale of urgency rating (e.g., a rating of 1-5). In another example, solicitors arriving at the home during normal business hours may have a scale of urgency higher than a resident of the home.

In another example, if the system 100 detects a delivery the scale of urgency may be higher in order to prevent package thefts. In another example, potential burglars may have the highest rating on the scale of urgency (e.g., 95-100). A high scale of urgency rating when a potential burglar is detected may result in sending an alert to the authorities 208. Information may be sent to the authorities 208 before and after an alarm is triggered to prevent false alarms. The scale of urgency may be customized by each user. The scale of urgency may determine what kind of output signal to produce (e.g., no alert, a simple text alert sent to the smartphone 110, a ring tone alert sent to the smartphone 110, alerting a monitoring service such as the receptionist 206, sounding a panic siren, and/or alerting the authorities 208). In one example, the scale of urgency may be a numerical scale (e.g., 1-100), a color scale (e.g., green to red), static to flashing, silence to a loud alarm, etc.

In one example, a delivery person may visit the front door (e.g., one of the access points 204a-204n). An alert may be sent to the homeowner. The system 100 may enable the homeowner to verify the identity of the delivery person through video and/or a two-way intercom. The system 100 may enable the homeowner to remotely open any door (e.g., a garage door) and/or ask the delivery person to put the package inside the house and/or the garage. The homeowner may remotely close the door, via RF signal from the smart camera system 102.

A network of trusted neighbors (e.g., the homes and/or business premises 202a-202n) may keep an eye on the property of other trusted neighbors 202a-202n. Mobile video devices such as the smartphones 110a-110n, video technology in the smart cameras 102a-102n, 2-way intercoms and/or sharing of "unwelcomed visitors" may be configured to form the eNeighborhood Watch system 200. The group of trusted neighbors 202a-202n may act as if they are the homeowner and present in the home to help deter unwelcomed visitors. The database 114 may store a list of "unwelcomed visitors" among a network of neighbors 202a-202n. The list of unwelcomed visitors may be accessed on the database 114 by using the web interface 112. By using the database 114, the neighborhood 202a-202n may influence unwelcomed visitors to not target their homes. In one example, the system 100 may prevent vandalism. A distance may be set (e.g., 2 ft) and if the hand of a visitor gets too close to the smart camera 102, the smart camera may automatically play a pre-recorded message to deter vandalism of the smart camera 102 and/or any property. The pre-recorded message may be a reminder that the image of the visitor has been uploaded to the cloud service 108. Further deterrence methods may include sirens, flashing lights, smoke, and/or tear gas.

In one example, a professional central monitoring service may act as the receptionist 206 to communicate with visitors detected at the access points 204a-204n. The central monitoring service facilities may qualify for home insurance discounts. The receptionist 206 may have access to a list of "welcomed visitors" and "unwelcomed visitors" of the various homes 202a-202n on the database 114. The receptionist may be trained on how to respond to different visitors including calling the authorities 208. The receptionist 206 may have access to the eNeighborhood watch database 114. The receptionist functionality may be integrated with the eNeighborhood Watch, allowing users to quickly see if the visitor has already been tagged as suspicious (e.g., on a blacklist) or friendly (e.g., on a whitelist) by another member of the neighborhood 202a-202n.

The system 100 may also implement cloud and/or social connectivity. The smart camera 102 may be connected to a social network consisting of neighbors and/or trusted friends. For example, the neighbors and/or trusted friends may be able to view videos and images taken by the home user. In another example, the neighbors and/or trusted friends may also take action on behalf of the home owner. The smartphones 110a-110n may allow for one-click sharing. For example, content collected by the smart camera system 102a-102n may be easily and directly shared onto the eNeighborhood Watch system 200 by a single click to quickly enable other members of the network to quickly view the content.

The smart camera 102 may automatically collect videos and/or images of individuals. Videos, audio, visitor IDs, visitor profiles and/or images collected by the smart camera 102 may be uploaded to the database 114. Entries for individuals in the database 114 may be updated automatically to reflect the current appearance of the visitor without requiring effort by the users to take extra pictures and manually update visitor profiles.

The eNeighborhood Watch system 200 may share functionality with other trusted users. The eNeighborhood Watch system 200 may be used to share access, notifications, and/or other system functionality with other trusted users. For example, if a child is visiting the home of a friend that is equipped with the eNeighborhood Watch system 200, the home owner may allow the parents of the child to access the video, and/or images from the smart cameras 102a-102n. Alerts (e.g., delivered via text message, email and/or other means) may be sent from the system 200 so that the parent may be assured that the child safely arrived at the proper destination.

The eNeighborhood Watch system 200 may have multiple levels of trust. Members of the eNeighborhood Watch system 200 may designate another user with different levels of trust. For example, a designated user may be given different default levels of access and/or sharing privileges to the content generated by the smart cameras 102a-102n than the home owner. The home owner may not have to specify each time what access privileges other members will have. The user may be able to share to groups with the same level of trust, and the user may not have to specify individual members to share to.

The system 100 may automatically arm and/or disarm an alarm system and/or send a reminder to smartphone 110 to arm/disarm the alarm. The alarm may be armed/disarmed using facial recognition or voice recognition. The system 100 may keep track of the number of people inside the premise. The tracking may be done by using a smart camera to identify people coming and leaving the premise, detecting a RFID device carried by all people on the premise, a Bluetooth low energy signal on the smartphones 110a-110n, and/or other mobile ID devices. Tracking of an RFID device, a Bluetooth low energy signal, and/or other mobile ID devices may be performed by one of the sensor modules 516a-516m of the sensor I/O block 514.

The functions performed by the diagrams of FIGS. 6-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A system comprising:
an antenna module configured to connect and send data to a network through a wireless connection; and
a processor sub-module configured to provide a physical connection to (i) said antenna module, (ii) a plurality of output devices, and (iii) a plurality of sensors, wherein (A) said plurality of sensors send data to said network, (B) a plurality of said systems are configured as an eNeighborhood Watch system, (C) information from said network is sent before and after an alarm is triggered by said system, and (D) said processor sub-module uses said information to prevent false alarms.

2. The system according to claim 1, further configured to (i) connect to web services, (ii) integrate with user devices and (iii) use said web services and said user devices to enable homeowners to perform web-based self-monitoring, wherein said web services receive said information from said network.

3. The system according to claim 2, wherein said information from said network is also presented to at least one of: (a) trusted volunteers, (b) central monitoring services, and (c) authorities.

4. The system according to claim 3, further configured to use said web services and said user devices to authorize said trusted volunteers to be a first line of response to an alarm triggered by said system, wherein (a) alerts are sent in parallel to all of said trusted volunteers, (b) an online training session is taken by said trusted volunteers, and (c) said trusted volunteers can activate a set of pre-determined actions.

5. The system according to claim 3, wherein said central monitoring services respond to alarms from said system and invoice the homeowner for services rendered if none of said trusted volunteers is available after a preset amount of time.

6. The system according to claim 3, wherein progressive and optional features are available from said central monitoring service that range from a virtually free service to a state-of-the-art monitoring service.

7. The system according to claim 1, wherein (a) said plurality of sensors are configured to record video clips and images of a detected visitor and (b) said recorded video clips and images are sent to a user via said network as an alert reporting said detected visitor to said user.

8. The system according to claim 1, wherein said data from said plurality of sensors includes data from cameras, passive infrared sensors, active infrared sensors, sonar, sound, contact, electromagnetic field sensors, acoustic sensors, voice recognition sensors, facial recognition sensors, gesture sensors, weather sensors, radio-frequency identification sensors, Bluetooth low energy sensors, and security system sensors.

9. The system according to claim 1, further configured to learn the behavior of detected individuals, wherein said learned behavior is used to perform energy saving and security automation.

10. The system according to claim 1, further configured to learn a daily schedule of inhabitants by recording daily arm/disarm patterns and observing movements of said inhabitants using said plurality of sensors.

11. The system according to claim 1, further configured to aggregate data from said plurality of sensors to build a unified status of the occupancy and security of a location.

12. The system according to claim 11, further configured to use said unified status to adjust heating and cooling to save energy and provide a comfortable environment.

13. The system according to claim 11, further configured to use said unified status to adjust a smart lighting system for interior and exterior lighting to save energy and provide a comfortable environment.

14. The system according to claim 1, wherein (i) said plurality of output devices is configured to implement a virtual receptionist and (ii) said virtual receptionist is configured to execute a response to a detected individual based on a scale of urgency determined by the behavior of said detected individual.

15. The system according to claim 14, further configured to (a) develop a profile of said detected individual, (b) store said profile to web services and (c) update said profile with new data detected by said system.

16. The system according to claim 1, wherein said system is automatically armed and disarmed using facial recognition and voice recognition.

17. An apparatus comprising:
an antenna module configured to connect and send data to a network through a wireless connection; and
a processor sub-module configured to provide a physical connection to (i) said antenna module, (ii) a plurality of output devices, and (iii) a plurality of sensors, wherein (A) said plurality of sensors send data to said network, (B) said apparatus is further configured to learn the behavior of detected individuals and (C) said learned behavior is used to perform energy saving and security automation.

18. A system comprising:
an antenna module configured to connect and send data to a network through a wireless connection; and
a processor sub-module configured to provide a physical connection to (i) said antenna module, (ii) a plurality of output devices, and (iii) a plurality of sensors, wherein (A) said plurality of sensors send data to said network and (B) said system is further configured to learn a daily schedule of inhabitants by recording daily arm/disarm patterns and observing movements of said inhabitants using said plurality of sensors.

19. The system according to claim 18, further configured to aggregate data from said plurality of sensors to build a unified status of the occupancy and security of a location.

20. The system according to claim 18, wherein (i) said plurality of output devices is configured to implement a virtual receptionist and (ii) said virtual receptionist is configured to execute a response to a detected individual based on a scale of urgency determined by the behavior of said detected individual.

* * * * *